H. M. BROWN.
STOPPER APPLYING MACHINE.
APPLICATION FILED SEPT. 19, 1911.
1,034,070.
Patented July 30, 1912.
8 SHEETS—SHEET 1.
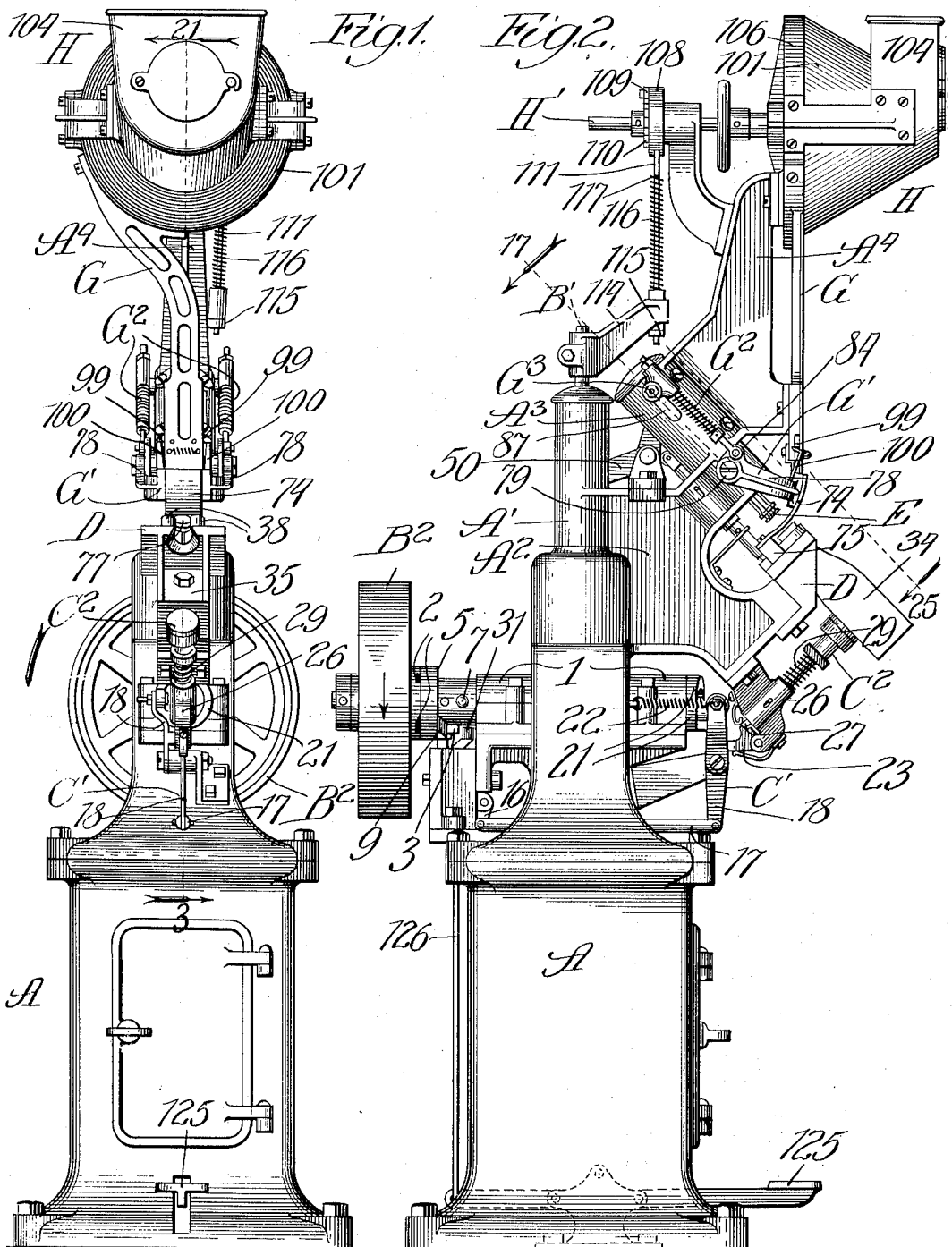
Witnesses:
Inventor.
Harry M. Brown,

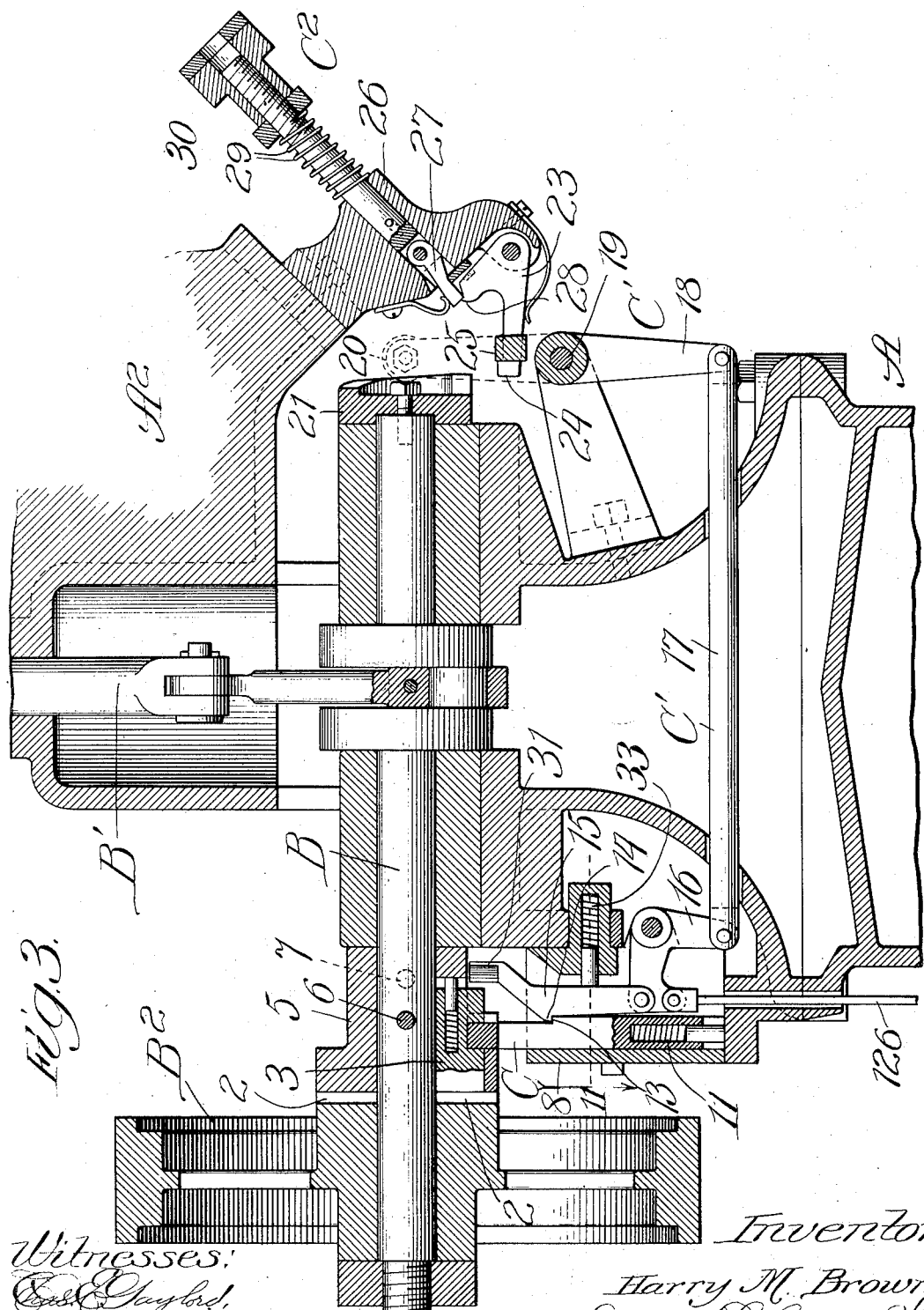

H. M. BROWN.
STOPPER APPLYING MACHINE.
APPLICATION FILED SEPT. 19, 1911.
1,034,070.
Patented July 30, 1912.
8 SHEETS—SHEET 3.
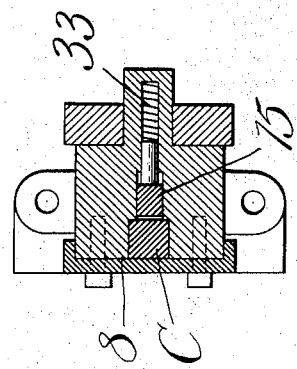

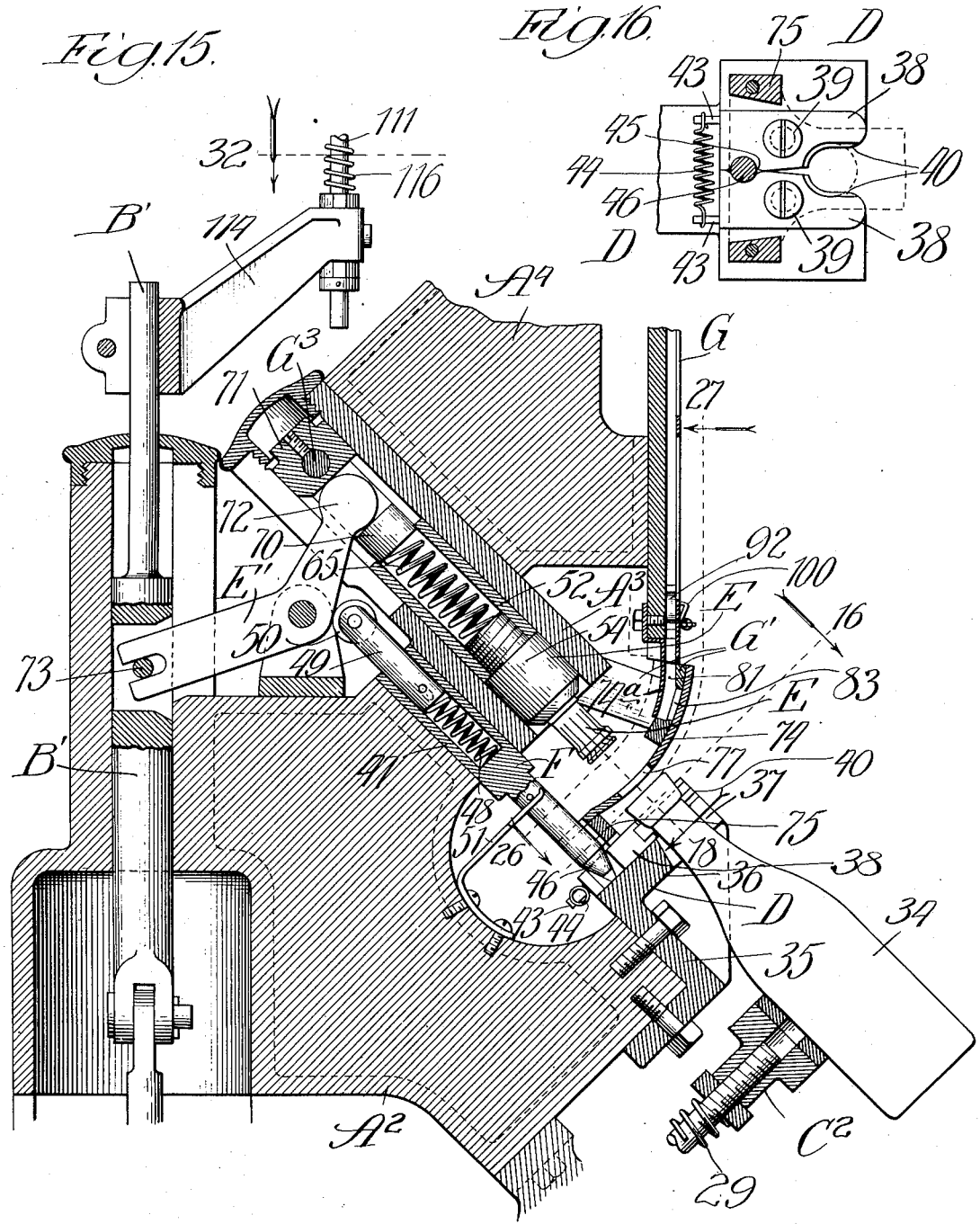

H. M. BROWN.
STOPPER APPLYING MACHINE.
APPLICATION FILED SEPT. 19, 1911.
1,034,070.
Patented July 30, 1912.
8 SHEETS—SHEET 5.
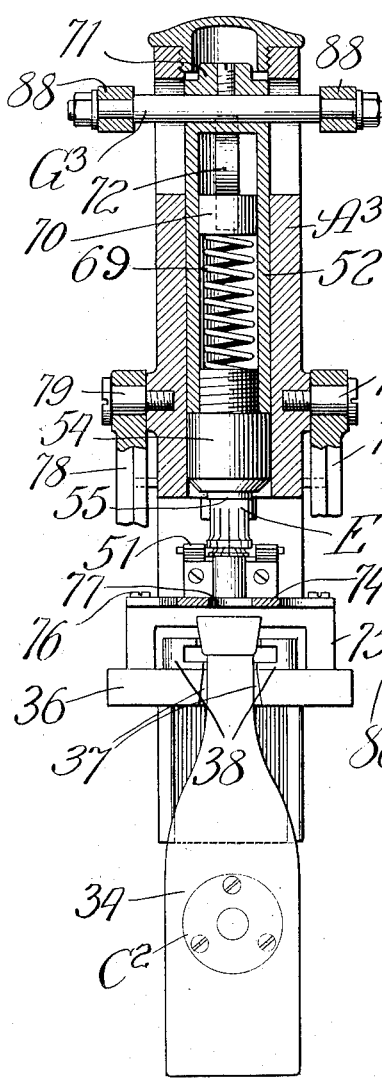
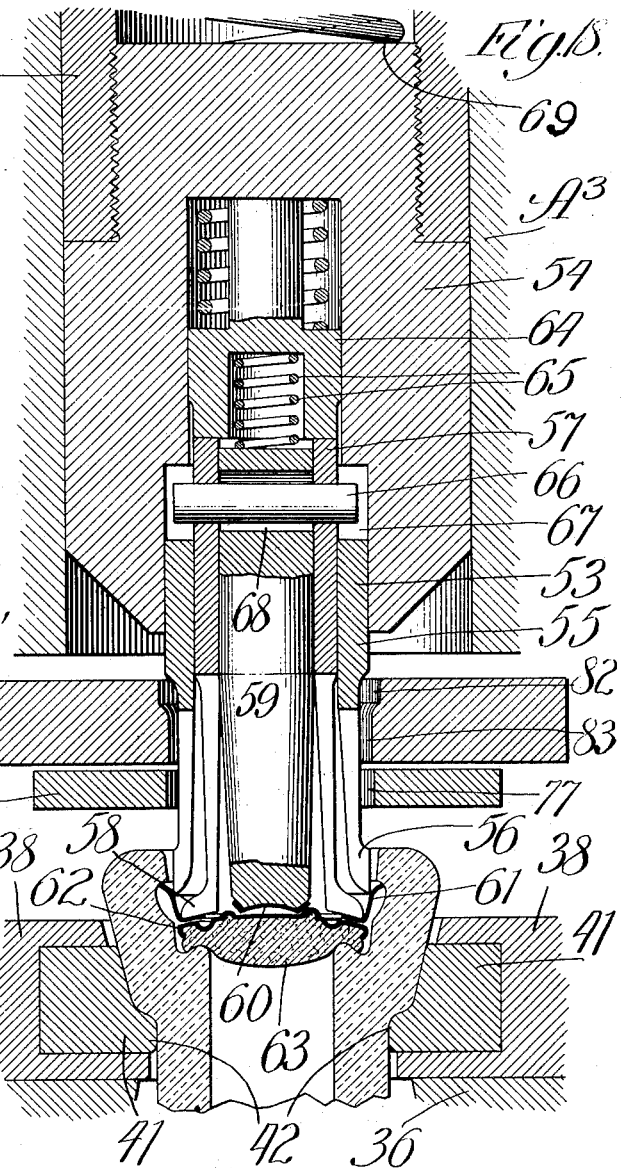
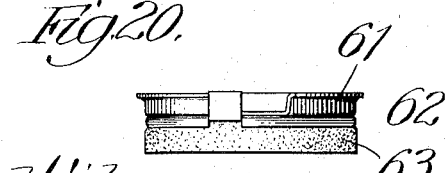
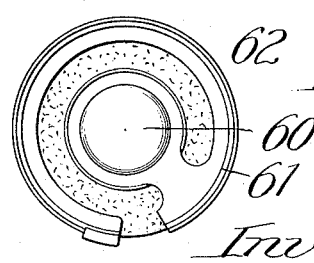
Inventor.
Harry M. Brown,

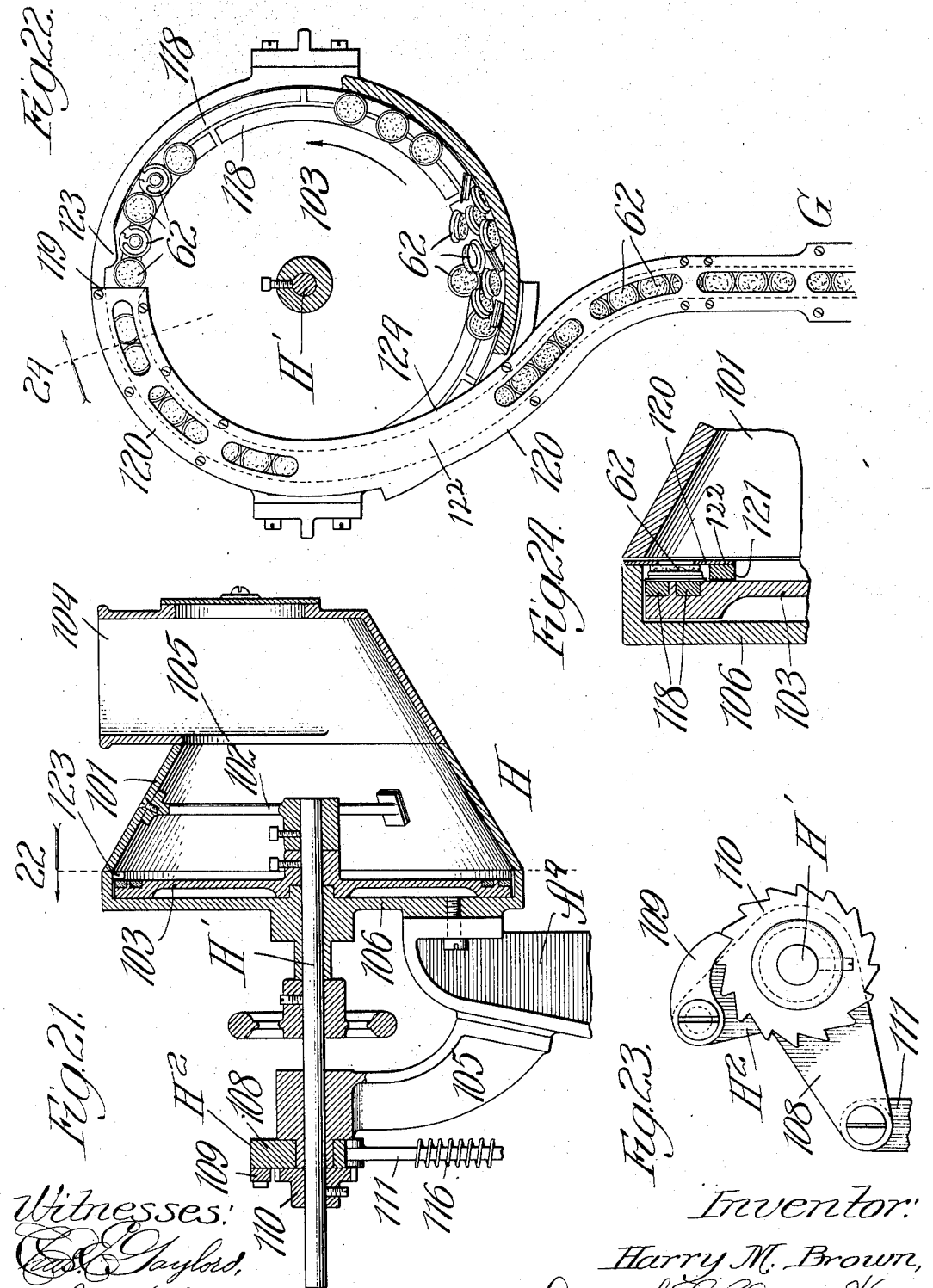
H. M. BROWN.
STOPPER APPLYING MACHINE.
APPLICATION FILED SEPT. 19, 1911.
1,034,070.
Patented July 30, 1912.
8 SHEETS—SHEET 6.

H. M. BROWN.
STOPPER APPLYING MACHINE.
APPLICATION FILED SEPT. 19, 1911.
1,034,070.
Patented July 30, 1912.
8 SHEETS—SHEET 7.
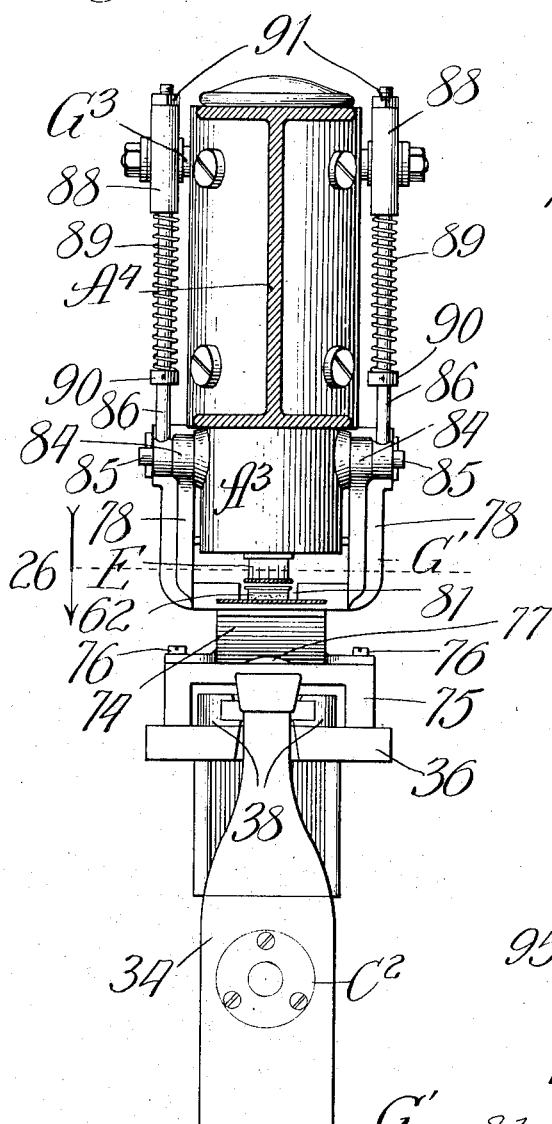
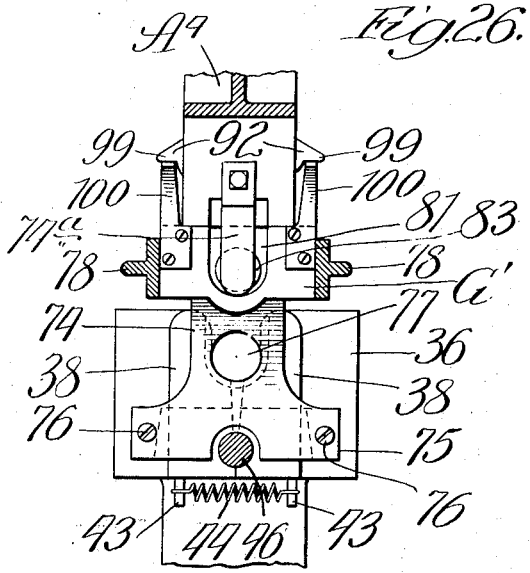
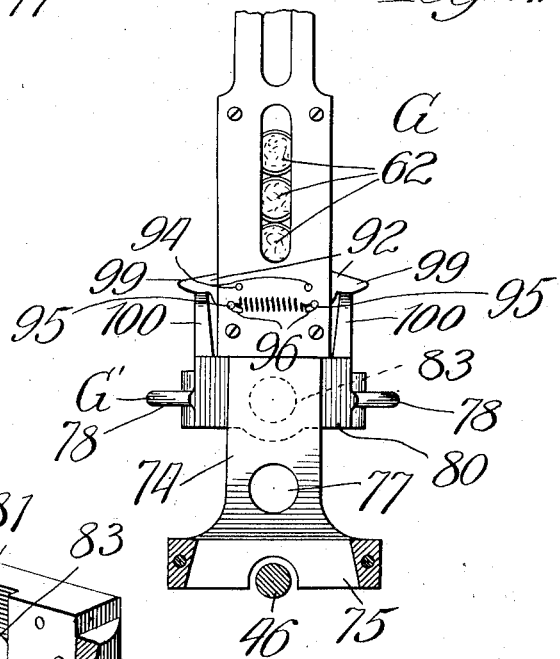
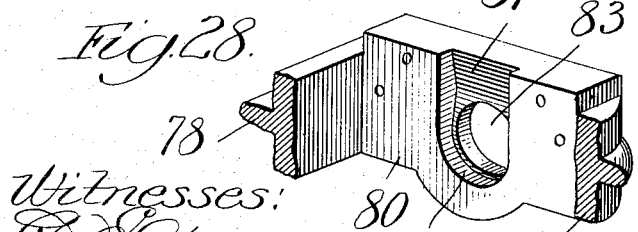

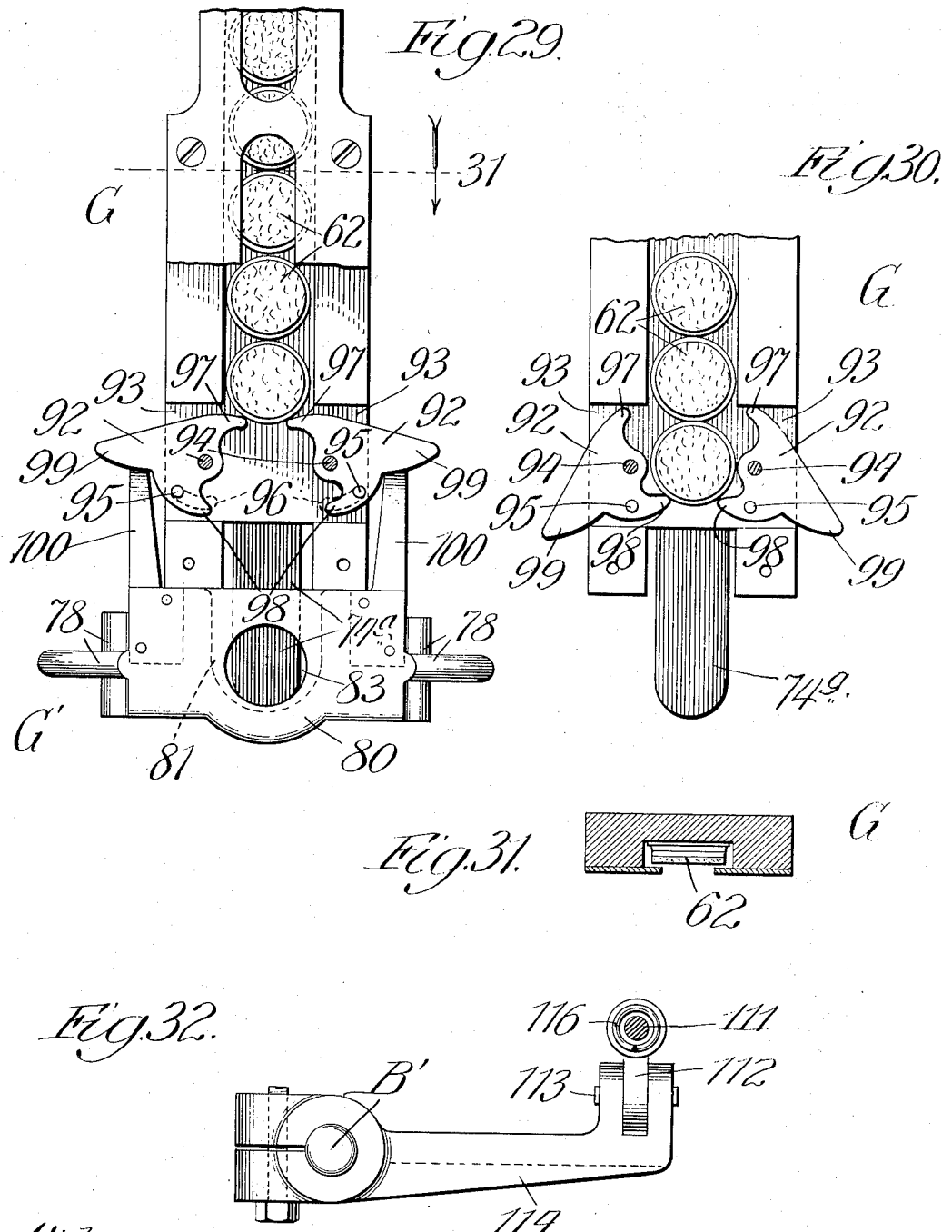

UNITED STATES PATENT OFFICE.

HARRY M. BROWN, OF BROOKLYN, NEW YORK, ASSIGNOR TO RICHARD A. CANFIELD, OF PROVIDENCE, RHODE ISLAND.

STOPPER-APPLYING MACHINE.

1,034,070. Specification of Letters Patent. Patented July 30, 1912.

Application filed September 19, 1911. Serial No. 650,295.

*To all whom it may concern:*

Be it known that I, HARRY M. BROWN, a citizen of the United States, residing at Brooklyn, in the county of Kings and State of New York, have invented a new and useful Improvement in Stopper-Applying Machines, of which the following is a specification.

This invention relates particularly to means for applying sealing devices or stoppers to bottles; and the primary object of the invention is to provide a machine of simple construction which will operate in an improved manner and rapidly perform the stoppering operation.

The invention is illustrated in its preferred embodiment in the accompanying drawings, in which—

Figure 1 is a front elevational view of the improved stoppering machine; Fig. 2, a left side (facing the machine) elevational view of the same; Fig. 3, an enlarged broken section taken as indicated at line 3 of Fig. 1, this view showing the normally idle actuating shaft and the clutch mechanism for connecting it with the continuously rotating pulley mounted thereon; Fig. 4, a broken perspective view of the inner hub of the pulley; Fig. 5, a perspective view of a sleeve fixedly mounted on the shaft and provided with a key-way for a sliding clutch member; Fig. 6, a perspective view of a clutch-disengaging dog; Fig. 7, a plan view of the same; Fig. 8, a perspective view of a dog-retracting member; Fig. 9, a plan view of the same; Fig. 10, a perspective view of the sliding clutch-member or key employed; Fig. 11, a section taken as indicated at line 11 of Fig. 3; Fig. 12, a perspective view of a normally locked spring-actuated lever forming part of the dog-retracting mechanism which serves to actuate the clutch-disengaging dog; Fig. 13, a perspective view of a bell-crank locking lever which co-acts with the member shown in Fig. 12, and which is adapted to be tripped by the bottle-actuated plunger shown in the right-hand portion of Fig. 3; Fig. 14, a perspective view of a lever-restoring cam carried by the end-portion of the shaft shown in Fig. 3; Fig. 15, an enlarged broken section taken as indicated at line 3 of Fig. 1, this view showing the stopper-inserting tool, its relation to the bottle-neck support, and an oscillating stopper-carrying device which serves to transfer the stoppers from the lower end of the stopper-chute to the path of the stopper-inserting plunger; Fig. 16, a section taken as indicated at line 16 of Fig. 15 and showing the bottle-neck clamping means employed; Fig. 17, a section taken as indicated at line 17 of Fig. 2; Fig. 18, a section taken as indicated at line 18 of Fig. 15, this view showing the relation of the parts at the instant of completion of the stoppering operation;
Figs. 19 and 20, plan and elevational views, respectively, of the stopper or seal which the stoppering tool shown is particularly adapted to insert; Fig. 21, a broken section taken as indicated at line 21 of Fig 1 and showing the stopper selecting and feeding mechanism; Fig. 22, a section taken as indicated at line 22 of Fig. 21; Fig. 23, a broken rear elevational view of the ratchet mechanism for actuating the rotary stopper chamber and its magnet-equipped disk-form end or bottom; Fig. 24, an enlarged broken section taken as indicated at line 24 of Fig. 22; Fig. 25, a section taken as indicated at line 25 of Fig. 2, this view showing the stoppering-tool guide, and the oscillating stopper-transferring device mounted thereon; Fig. 26, a section taken as indicated at line 26 of Figs. 15 and 25, this view showing the relation of the stopper-receiving web portion of the oscillatory yoke-form stopper-transferring device, the lower portion of the stopper chute, and the bottle-neck clamping means; Fig. 27, a view taken as indicated at line 27 of Fig. 15; Fig. 28, a broken perspective view of the oscillating stopper-transferring device; Fig. 29, an enlarged broken view showing the escapement at the lower end of the stopper chute and the co-acting actuating means carried by the oscillatory stopper-transferring device; Fig. 30, a broken view showing the normal position of the escapement members; Fig. 31, a section taken as indicated at line 31 of Fig. 29; and Fig. 32, a view taken as indicated at line 32 of Fig. 15.

In its preferred embodiment, the invention comprises a frame A having a tubular standard or plunger-guide $A^1$ carrying a bracket $A^2$ upon which is mounted a stoppering-tool guide $A^3$ surmounted by a bracket $A^4$ which serves to support the stopper-hopper; a normally inactive crank-shaft B to which is linked a vertically reciprocating plunger $B^1$ which moves in the tubular standard A¹, said shaft being equipped with a loosely mounted pulley B²; a clutch-disengaging dog C adapted to be withdrawn from engagement with the sliding clutch member employed by means of automatically tripped mechanism C¹, which includes a bottle-pressed, or bottle-actuated, member C²; a bottle-neck support D mounted on the bracket A² and equipped with neck-clamping means D¹; a reciprocating seal-applying tool E mounted in the tool-guide A³ and actuated by a bell-crank lever E¹ connected with the plunger B¹; a neck-clamp closing device F actuated by the bell-crank lever E¹; a stopper-chute G, with which co-acts an oscillatory yoke-shaped stopper-transferring member G¹ whose arms are pivotally mounted on the guide A³ and connected by actuating rods G² with the ends of a bolt or stud G³ carried by the upper end of the stoppering plunger E; and a rotary stopper chamber H mounted on a shaft H¹ which is actuated by ratchet mechanism H².

The frame A may be of any suitable construction, that shown being well adapted to the purpose. It is provided with bearings 1 in which the crank-shaft B is journaled. The pulley B² has the inner end of its hub provided, as shown in Fig. 4, with a series of recesses 2, any one of which may be engaged by the sliding key or clutch member 3. The clutch member 3 is slidable in the groove 4 in a sleeve or collar 5 (Fig. 5) which is secured to the shaft D by a pin 6. The sleeve 5 is equipped with a cam-pin 7 which co-acts with a member of the dog-retracting mechanism C¹.

The key-retracting dog C (Figs. 3, 6 and 11) is adapted to move vertically in a guide 8 with which the frame is provided. Said member C is provided with a curved or segmental head having a knife-edge end 9 adapted to enter a slot 10 with which the key 3 is provided. The member C is raised by the spring 11 to the key-withdrawing position. The head portion of the member C is provided at the base of the tapering portion with a shoulder 12, which acts as a stop to engage a lateral surface of the sliding key 3 after the withdrawal is effected, so that the revolution of the shaft B will be stopped. The shank of the member C is provided with a shoulder 13 adapted to be engaged by a projection 14 of the dog-withdrawing member 15 which forms a part of the automatic dog-disengaging mechanism C¹. Said mechanism C¹ comprises, in addition to the vertically movable member 15, a bell-crank lever 16 having one arm pivotally joined to the lower end of the member 15; a connecting rod 17 joined to the downturned arm of the member 16 and connected with the lower end of a lever 18 which is supported on a pivot 19 carried by the frame. The upwardly extending arm of the lever 18 is equipped with a cam roller 20 adapted to be engaged by a cam 21 (Figs. 13 and 14) which is secured to the end of the shaft B. A spring 22 connected with the frame and with the upper end of the lever 18 tends to actuate the lever and throw the connecting rod 17 from the position shown in Fig. 3, thereby swinging the bell-crank lever 16, depressing the member 15 and withdrawing the dog C from engagement with the slot 10 of the sliding clutch member 3, thus permitting the clutch member to engage one of the grooves 2 in the inner end of the hub of the wheel B². This action is normally resisted by a bell-crank latch member 23 (Figs. 3 and 13), one of the arms of which is provided with a small projection, or latching-shoulder, 24, which normally engages a shoulder or projection 25 with which the upper end of the lever 18 is equipped. The bottle-actuated plunger C², which is adapted to be engaged by the body of the bottle, moves in a guide 26 carried by the bracket A² and has pivotally connected with its inner end portion a spring-pressed pawl 27 which is adapted to engage a shoulder or projection 28 with which the short arm of the bell-crank latch member 23 is provided. The member C² is held normally projected by a spring 29 confined between the head portion 30 of the plunger and the guide 26. The head portion of the plunger is in the form of an internally threaded perforate disk which is adjustable on the plunger, both for the purpose of applying tension to the spring 29 and bringing the upper or outer surface of the head portion of the plunger to exactly the right position, so that when the bottle is pressed into the neck-clamping support, the body of the bottle will actuate the plunger C² and trip the latch 23, thereby permitting the spring 22 to actuate the dog-retracting mechanism, so that the sliding clutch member 3, which is spring-pressed, will spring into engagement with a clutch recess in the hub of the pulley B². When this occurs, the shaft B makes one revolution, and the cam 21 restores the lever 18 to its normally latched position.

After the member 15 is depressed to withdraw the key-retracting dog C, it is desirable that the member 15 shall be disengaged from the member C, so that said member may return at once to a position to engage the slot 10 of the key 3 and retract the key, thus permitting the shaft B to make only one revolution. To this end, the member 15 has an extension 31 which projects into the path of the cam-pin 7 carried by the collar 5, said projection being provided with a beveled surface 32 adapted to be engaged by the pin 7. Thus the pin 7 will serve to swing the member 15 away from the member C, against the action of the spring 38 (Fig. 11), this action occurring immediately after the member C has been lowered sufficiently to disengage it from the spring-pressed key 3, which, in the meantime, moves to the clutch-engaging position.

The member $C^2$ and the bottle-neck support D are adapted to support the bottle 34 in an inclined position, as clearly appears from Fig. 15. The bottle-neck support is formed by a bracket 35 which is detachably secured to the bracket $A^2$ and has a projecting inclined plate-form portion 36 disposed at right angles to the direction of movement of the stopper-inserting tool E. The member 36 is provided with a recess 37 which has a half-circular inner end. The neck-clamping device $D^1$ comprises a pair of jaws 38 which are connected, by pivots 39, with the upper surface of the plate 36. The forwardly projecting arms of the jaws 38 are provided (Figs. 16 and 18) with complemental recesses 40, which, together, form approximately a half-circular contour at their inner end, corresponding with the contour of the recesses 37 in the plate 36, but of a somewhat smaller diameter. At the recesses 40, the jaws 38, which are of metal, are provided with inserts 41, which may be of hard rubber, or any suitable substance adapted to prevent breakage. As shown in Fig. 18, the inserts 41 are suitably matrixed or recessed to conform to the external flange of the bottle-neck and the bottle-neck itself immediately beneath the flange. Thus the matrices of the members 41 converge to the portion 42 which are adapted to engage the cylindrical surface of the bottle-neck. The formation is such that the bottle will be securely held against longitudinal movement through the medium of its neck-portion when pressure is exerted in applying the bottle-seal, or bottle stopper.

The base ends of the jaws 38 are equipped with pins 43 connected by a spring 44, which tends to hold the jaws open. The adjacent edges of the base portions of the jaws are provided with complemental recesses 45 between which is adapted to enter the beveled or wedge portion 46 of the jaw-locking device F.

From Figs. 2 and 15, it appears that the bracket $A^2$ presents an inclined breast at the forward side of the frame, upon which the bracket 35 is mounted, so that the flange 36 thereof inclines forwardly and upwardly and the recess 37 opens forwardly and upwardly; also that the jaws 38 surmount the member 36 and have their recesses 40 presented or open forwardly and upwardly. Moreover the bottle-actuated member $C^2$ is disposed beneath the bracket D and has an inclined stem or plunger (Fig. 3), while the upper or outer face of the member, or head, 30 (Fig. 3), has the same inclination which the bottle is to take. The bottle, it is noted, may be inserted by lateral movement, as is evident from Figs. 2 and 15; and in this movement the flange of the bottle-neck is brought into engagement with the matrixed or countersunk portions of the clamping members 38 (Fig. 18), while the body of the bottle actuates the member $C^2$ of the trip mechanism.

The device F comprises a plunger having the tapering portion 46, and having a shank 47 which moves in a guide formed in or beneath the guide $A^3$ (Fig. 15). The shank 47 is tubular and contains a spring 48 against which bears a shank section 49 equipped with a cam-roller 50 which is engaged by the bell-crank lever $E^1$. Thus, the locking pin is adapted to be moved to the locking position when the lever $E^1$ actuates the stopper-inserting tool E. A spring 51 serves to retract the locking device F.

The seal-applying tool E may be of any approved form, and adapted to apply any form of bottle seal. The form of device illustrated is adapted to apply a bottle-stopper or seal of the character shown in Figs. 19 and 20 which is adapted to be inserted and locked within the mouth of the bottle, as shown in Fig. 18. The device E as illustrated thus comprises a tubular plunger 52 which moves in the guide $A^3$ and which has its operative end fitted with a compound stoppering tool 53. The tubular member 52 is fitted with a head 54, which carries the tool 53. The tool 53 is of known construction. It comprises an outer tubular member 55 provided with contractile fingers 56, the member 55 being rigidly inserted in a socket with which the member 54 is provided; an inner tubular member 57 which is movable with relation to the member 55 and is provided with stopper-engaging fingers 58; and a centering pin 59 which is adapted to engage the tab-portion 60 of the locking ring 61 with which the stopper or seal 62 is equipped. It may be explained that the stopper shown comprises a cap fitted with a sealing disk or cork disk 63 on which the flange of the cap is clenched, and the cap is surmounted by a locking ring or retainer ring 61 which is adapted to engage the annular locking groove with which the bottle-neck mouth is provided.

The inner end of the tubular member 57 abuts against a spring-pressed plug 64 carried by the head 54; and the plug 64 is provided with a recess containing a spring 65 against which the inner end of the centering member 59 abuts. The tubular member 57 is provided with a transverse stud 66 which is movable in slots 67 with which the upper end of the tubular member 55 is provided; and the upper end portion of the centering member 59 is equipped with a slot 68 through which the pin 66 extends freely, so that the member 59 can move with relation to the member 57.

The tubular member 52 contains a powerful spring 69 through which the stoppering pressure is applied. The lower end of the spring bears against the head 54, and the upper end bears against a follower 70, between which and a member 71 forming the upper end of the tubular member 52 is confined the rounded actuating end 72 of the bell-crank lever $E^1$. The other arm of the lever $E^1$ projects into a slot with which the plunger $B^1$ is provided, and is itself provided with a slot which is engaged by a pin 73 carried by the plunger $B^1$.

The stoppers descend through the vertically disposed stopper chute G to the oscillatory transferring device $G^1$, which carries them to the path of the stoppering tool. The lower end of the chute G terminates some distance above the bottle-neck support and above a curved guide member 74 which virtually forms a continuation of the outer wall of the chute G, but with sufficient space to permit the operation of the transferring device $G^1$. The member 74 is fixedly mounted on the neck-supporting plate 36 through the medium of a bridge member 75 (Figs. 15, 16, 25 and 26), which spans the movable clamping jaws 38, being secured to the plate 36 by screws 76. Said member 74 is provided with a perforation 77 through which the stoppers may be forced into the bottle-mouth. An inner guide-member $74^a$ depends from the chute G.

The oscillatory transferring device $G^1$ comprises a yoke having arms 78 supported on pivots 79 carried by the guide member $A^3$; and a web 80 connecting the outer ends of the arms 78 and adapted to swing from a position immediately beneath the lower end of the chute G to a position across the path of the stoppering tool. The web 80 is adapted to move in contact with the upper or inner surface of the guide member 74, and is provided with a recess 81 in its inner surface which intersects the upper edge surface of the web and is adapted to register with the lower end of the feed-chute G. The recess 81 comprises a slot having a half-circular lower end 82 (Fig. 28), upon which the stopper is adapted to rest edgewise. Through the web 80 and concentric with the lower portion of the recess 82 is a perforation 83 through which the stopper may be forced when the perforation 83 is brought into registration with the perforation 77 of the guide member 74.

The arms 78 are equipped near the pivots 79, with lugs 84, to which are joined, by pivots 85, connecting rods 86, whose rear ends are connected to the projecting end-portions of the pin or bolt $G^3$ carried by the member 71 of the reciprocatory stoppering tool E. The ends of the bolt $G^3$ project through slots 87 with which the guide member $A^3$ is provided in its sides. It is preferred to have the ends of the bolt $G^3$ connect directly with the tubular members 88 which incase the rear portions of the rods 87 and bear against springs 89 whose front ends abut against collars 90 with which the rods are equipped, the rear ends of the rods 86 being threaded and equipped with nuts 91. Thus, the member $G^1$ will be positively oscillated in both directions but with a yielding pressure in the downward swing.

As will be best understood from Figs. 29 and 30, the lower end of the stopper chute G is equipped with a pair of escapement members 92 which are received in slots 93 with which the edge walls of the chute are provided, and are connected to the chute by pivots 94 and pins 95 which move in guide-slots 96. The pivotal portions of the members 92 are located closely adjacent the path of the lateral edges of the stoppers 62, and are flanked by projections 97 and 98 which serve to separate and support the stoppers, as will be clearly understood from Figs. 29 and 30. The members 92 are equipped with actuating arms 99 adapted to be engaged by actuating members 100 carried by the oscillating transferring device $G^1$, as shown in Fig. 29. When the member $G^1$ swings downwardly, the members 92, by gravity, drop to the position shown in Fig. 30, so that a stopper 62 will be supported on the projections 98. When the member $G^1$ swings to the elevated position, the members 92 will move to the position shown in Fig. 29, whereby the projections 98 will drop the lowermost stopper, while the projections 97 will engage the next stopper.

The construction of the stopper selecting and feeding mechanism H will be understood from Figs. 1, 2, 21 to 24 inclusive, and 32. The device comprises a hollow stopper chamber 101 carried by a spider 102 mounted on the horizontally disposed shaft $H^1$; a disk 103 which substantially closes the large end of the chamber 101 and is fixedly mounted on the rotary shaft $H^1$; a stationary charging chute 104, one side of which is open at 105, the opening being in registration with the small end of the chamber 101; a flanged disk 106 which is fixedly mounted on the bracket $A^4$ and whose flange abuts against the adjacent large end of the conical member 101, the central portion of the disk 106 having a bearing through which the shaft $H^1$ extends; a bracket 107 mounted on the bracket $A^4$ and having a bearing for the outer portion of the shaft $H^1$; a bell-crank lever 108 journaled on the bearing carried by the bracket 107 and equipped with a pulley 109 which engages a ratchet wheel 110 fixedly mounted on the shaft $H^1$; a connecting rod 111 pivotally connected at its upper end with the bell-crank 108 and having its lower end extending through a link 112 which is joined by a pivot 113 to an arm 114 fixedly mounted on the upper end of the plunger B¹, the connecting rod 111 being equipped, beneath the tubular bearing with which the link 112 is provided, with a nut 115; and a spring 116 confined between the link 112 and a shoulder or stud 117 with which the connecting rod is equipped. Thus, when the plunger B¹ rises, the movement will be yieldingly communicated through the spring 116 and connecting rod 111 to the bell-crank lever 108 of the ratchet device.

The rotary disk 103, which is disposed in a vertical plane, is provided adjacent its periphery on its inner surface with two series of annularly arranged permanent magnets 118. The disk 103 is preferably of brass, and the magnets are in the form of curved segments which appear as steel inserts on the inner face of the disk. At the upper portion of the rotary disk 103 and within the flange of the stationary disk 106 is the orifice 119 of a curved outlet chute 120 which, at the lower portion of the hopper, extends through the flange of the disk 106 and communicates with the upper end of the vertically disposed chute G, as shown in Fig. 22. The disk 103 and the insert magnets 118 thereof form the rear or outer wall of the chute 120. The lower wall or inner perimeter of the chute 120 is formed by a curved rectangular strip 121, while the outer perimeter is formed principally by the flange of the stationary disk 106, as will best be understood from Fig. 24. The inner wall is formed by a curved plate 122, which is provided with perforations through which the stoppers within the chute are exposed in Fig. 22. It is preferred to equip the flange of the stationary plate 106, in advance of the orifice 119 of the chute, with a cam finger 123 which is adapted to dislodge stoppers which are not properly held with relation to the magnets, that is, stoppers which are turned the wrong way, so that those stoppers which are reversed will not be carried into the outlet chute.

In the operation of the stopper selecting and feeding device, the stoppers, which are thrown in bulk into the rotary hopper, through the chute 104, are subjected to a tumbling action as the hopper rotates, in the course of which the stoppers tend to gravitate along the flaring sides of the rotary member 101 into contact with the rotary disk 103. In the tumbling action, those stoppers which lodge with their metal portions in contact with the magnets and with their cork disks turned away from the magnets are carried up in the manner indicated in Fig. 22 and caused to enter the outlet chute 120, through which they are forced. As the stoppers are carried through the chute 120 they are gradually slid across the faces of the magnets at the point 124, where the chute 120 crosses the annular path of the magnets. After the stoppers enter the chute G, their descent to the oscillating transferring device G¹ is controlled by the escapement device shown in Fig. 29.

Briefly stated, the operation of the machine is as follows: Continuous rotation is imparted to the pulley B² from any suitable source. Stoppers are fed to the chute G from the rotary hopper H in the manner described, and are advanced to the escapement device, both by the action of gravity and by the force exerted through the stoppers carried by the magnets in the rotary hopper. The operator places the filled bottle 34 in the bottle-neck support, as shown in Fig. 15. In this operation, he presses inwardly on the bottle, that is, moves the inclined bottle laterally, thereby forcing the plunger C² inwardly and at the same time bringing the bottle-neck to its proper position with relation to the bottle-neck support. When the plunger C² is moved inwardly it actuates the trip lever 23, thereby permitting the spring 22 to actuate the lever 18, shift the connecting rod 17 to the right from the position shown in Fig. 3, lower the dog-retracting member 15, and thereby withdraw the dog C¹ from engagement with the spring-pressed sliding clutch member 3, which thereupon operatively engages one of the recesses of the wheel B², thus locking the shaft B to the rotating wheel. Thereupon, the shaft B makes one rotation, during which the cam-stud 7 rocks the dog-retracting member 15 out of engagement with the dog, thereby permitting the dog to return to the clutch disengaging position, where it will serve to withdraw the clutch when the rotation of the shaft is completed. During the rotation of the shaft, the lever 18 is restored to its latched position; and when the bottle is removed, after stoppering, the plunger C² returns to its normal position, bringing the pawl 27 into engagement with the nose 28 of the bell-crank latch member 23. The shaft B, in its rotation, reciprocates the plunger B¹, thereby actuating the rotary hopper and reciprocating the stopper-inserting tool E. During the downward stroke of the stopper-inserting tool, the clamp-locking device F is actuated, so that the neck portion of the bottle, including the external flange, will be securely clamped preparatory to the exertion of the stoppering force through the medium of the tool E. Prior to the stoppering action, that is, during the downward descent of the tool E, the oscillating stopper-transferring device G¹ is actuated, thereby carrying a stopper from the lower end of the chute G to a point where it registers with the opening 77 of the guide 74, so that the stopper will be in position to be forced by the stoppering tool through the opening 77 and into the adjacent mouth of the bottle. When the transferring device G¹ returns to its elevated position, it serves, through the medium of the members 100, to actuate the escapement member 92, thereby permitting a stopper to drop into the recess or pocket 81 of the device G¹.

As thus described, the operation of the machine is automatic, the only duty devolving upon the operator being that of inserting and removing the bottles. For some purposes, as where a very cheap machine is desired for a small bottling plant, it may be desirable to omit the automatic dog-retracting mechanism C¹ C². In such case, there may be employed, in lieu thereof, a foot-treadle 125, with which is connected a connecting-rod 126 whose upper end is joined to the lower end of the dog-retracting member 15, so that when the rod 126 is lowered through the medium of the treadle, the member 15 will be drawn downwardly, thereby retracting the dog C.

In its simplest form, the machine may be without the automatic-feeding mechanism shown, in which case the machine will be reduced to an exceedingly simple and cheap construction. The feature of employing the bottle-neck clamp, instead of having the bottle stand on a support, as has heretofore been common, is a feature of very great importance. The significance of this will be understood when it is explained that bottles vary considerably in size and regularity, even when great care is exercised in their manufacture, so that it has heretofore been necessary to take this factor into account in the construction of stoppering machines. This has rendered necessary the use of mechanisms of considerable complexity to compensate for variations in size and regularity of the bottles, that is, to provide means for automatically adjusting the pressure of the stoppering tool to compensate for variations in the bottles and thereby avoid breakage. It is possible, however, to make the neck and mouth portions of the bottles fairly uniform in the process of manufacture, so that by employing a bottle-neck clamp as herein disclosed it is possible to dispense with the complex automatic tensioning devices heretofore required. A considerable advantage is gained, also, by the inclined disposition of the stoppering tool and bottle-neck support, which facilitates the insertion of the bottles and also facilitates the observation of the operation of the machine.

The foregoing detailed description has been given for clearness of understanding only, and no undue limitation should be understood therefrom, but the appended claims should be construed as broadly as permissible in view of the prior art. The invention is adapted to the purpose of applying bottle seals or bottle stoppers of various forms.

What I regard as new and desire to secure by Letters Patent is:

1. In a bottle-seal applying machine, the combination of bottle-supporting means, a seal-applying tool, mechanism for imparting relative reciprocation, clutch mechanism, a clutch member withholding dog, dog-retracting mechanism having a member normally engaging said dog and a spring tending to retract the dog to permit the clutch-member to move to the clutching position, a trip normally restraining the dog-retracting mechanism, and means for operating said trip, said means having a member adapted to be actuated through the medium of a bottle when the bottle is inserted in its holding means.

2. In a bottle-seal applying machine, the combination of bottle-supporting means, a seal-applying tool, mechanism for imparting relative reciprocation, clutch mechanism, a clutch member withholding dog, dog-retracting mechanism having a member normally engaging said dog and a spring tending to retract the dog to permit the clutch-member to move to the clutching position, a trip normally restraining the dog-retracting mechanism, means for restoring the dog-retracting mechanism to the latched position, and means for operating the trip.

3. In a stopper-applying machine, the combination of a frame, a reciprocatory stoppering tool, a curved guide extending across the path of said tool and provided with a perforation through which said tool may work, a stopper-chute for which said guide forms a terminal, a bottle-supporting neck-clamping device carried by said frame and disposed below said guide, and an oscillatory stopper-transferring device associated with said curved guide and adapted to swing transversely across the path of said stoppering tool and provided with an opening adapted to register with said first-named opening, for the purpose set forth.

4. In a stopper-applying machine, the combination of a frame, a reciprocatory inclined stoppering tool, a curved guide extending across the path of said tool and provided with a perforation through which said tool may work, a stopper-chute for which said curved guide forms a terminal, a bottle-supporting, neck-clamping device carried by said frame and disposed below said curved guide, an oscillatory stopper-transferring device associated with said curved guide and adapted to swing transversely across the path of said stoppering-tool and provided with an opening adapted to register with said first-named opening, and means for actuating said stoppering-tool.

5. In a bottle-seal applying machine, the combination of a support having a forwardly-presented bottle-neck-receiving recess, neck-clamping members surmounting said support and having forwardly-opening jaws provided with countersunk recesses to receive the flanged bottle-neck and permit insertion of the bottle-neck by lateral movement of the bottle, a reciprocating seal-applying tool co-acting therewith, means for supplying bottle-seals to the path of said seal-applying tool, a locking-plunger for the neck-clamping members co-acting with the seal-applying tool, and means for actuating the seal-applying tool and locking plunger.

6. In a seal-applying machine, the combination of a vertical plunger, means for actuating the same, an inclined seal-applying plunger, a lever actuated by said first-named plunger and serving to actuate said second-named plunger, means for holding the bottle in an inclined position with its mouth in the path of said seal-applying plunger, and means for feeding seals to the path of the seal-applying plunger.

7. In a machine of the character set forth, the combination of bottle-supporting means, an inclined guide, a reciprocable stoppering tool movable therein, a rotary shaft, a vertically movable plunger actuated by said shaft, and actuating means for the inclined stoppering tool actuated by said plunger.

8. In a machine of the character set forth, the combination of bottle-supporting means, an inclined guide, an inclined reciprocable stoppering tool movable therein, a rotary shaft, a vertically movable plunger actuated by said shaft, an actuating lever for the inclined stoppering tool actuated by said plunger, and stopper selecting and feeding mechanism actuated through the medium of said plunger.

9. In a machine of the character set forth, the combination of bottle-neck clamping means, a reciprocating stoppering tool, a horizontally disposed rotary shaft serving to actuate the stoppering tool, a wheel journaled on said shaft, clutch mechanism, including a spring-pressed clutch member adapted to connect said wheel with said shaft, a clutch-member withholding dog, dog-retracting mechanism, including a dog-engaging member, and a spring-actuated lever connected with said member, a latch lever restraining said spring-actuated lever, a bottle-actuated device for tripping the latch lever, a cam carried by said shaft for restoring the spring-actuated lever to the latched position, and a cam carried by the shaft for disengaging the dog-engaging member from the dog.

10. In means of the character set forth, stopper-selecting mechanism comprising a rotary hopper having flaring walls, an end member for said hopper rotating therewith and having its inner surface equipped with magnets, and an outlet chute having an orifice adjacent the magnet-equipped portion of said end member.

11. In means of the character set forth, stopper-selecting mechanism comprising a rotary hopper having flaring walls, an end member rotating therewith and equipped near its periphery on its inner surface with magnets, an outlet chute having an orifice adjacent the path of said magnets, and means for intermittently rotating the hopper.

12. Stopper-selecting mechanism of the character set forth comprising a rotary hopper having flaring walls and an end wall rotating therewith, said end wall equipped with magnetic selecting devices, and an outlet chute associated therewith.

13. A stopper-selecting device comprising a horizontally disposed shaft, a hopper mounted thereon to rotate therewith, said hopper having flaring peripheral walls and an end member at its large end rotating with said shaft, said end member equipped on its inner surface near its periphery with magnetic devices, and an outlet chute adjacent the inner surface of said end member and having one of its walls formed by said end member and the magnetic devices thereof.

14. A stopper-selecting device, comprising a flaring rotary hopper, a stationary charging chute having one side opening into the small end of said hopper, a disk rotating with the hopper and substantially closing the large end thereof, said disk equipped near its periphery with magnets, and an outlet chute having one wall formed by said disk and its magnets, said outlet chute having its inner orifice in the upper portion of the hopper.

15. A stopper-selecting device comprising a hollow conical rotary member having a disk at its large end rotating with the hopper and equipped near its periphery with magnets, an outlet chute, one side of which is formed by said disk and its magnets, said chute having its inlet orifice in the upper portion of the hopper, and means adjacent said orifice adapted to dislodge improperly presented stoppers.

16. In a bottle-seal applying machine, the combination of a support having a forwardly presented bottle-neck receiving recess, neck-clamping members surmounting said support and having forwardly open jaws provided with countersunk recesses to receive a flanged bottle-neck and permit insertion of the bottle-neck by lateral movement of the bottle, a reciprocating seal-applying tool co-acting therewith, a shaft serving to actuate said tool, clutch-mechanism, and a bottle-controlled controlling device for said clutch-mechanism having a bottle-engaging member adapted to be moved by the bottle when it is moved into engagement with the neck-clamping members.

17. In a bottle-seal applying machine, the combination of a support having a forwardly presented bottle-neck receiving recess, neck-clamping members surmounting said support and having forwardly open jaws provided with counter-sunk recesses to receive a flanged bottle-neck and permit insertion of the bottle-neck by lateral movement of the bottle, a reciprocating seal-applying tool co-acting therewith, a shaft serving to actuate said tool, clutch-mechanism, a bottle-controlled controlling device for said clutch-mechanism having a bottle-engaging member adapted to be moved by the bottle when it is moved into engagement with the neck-clamping members, and a locking plunger for the neck-clamping members co-acting with the seal-applying tool.

18. In a seal-applying machine, the combination of a horizontally disposed shaft, a vertical plunger disposed above the same and actuated thereby, an inclined seal-applying plunger, a lever actuated by said first-named plunger and serving to actuate said second-named plunger, means for holding a bottle in an inclined position with its mouth in the path of said seal-applying plunger, and means for feeding seals to the path of the seal-applying plunger.

19. In a seal-applying machine, the combination of a horizontally disposed shaft, a vertical plunger disposed above the same and actuated thereby, an inclined seal-applying plunger, a lever actuated by said first-named plunger and serving to actuate said second-named plunger, inclined bottle-supporting means equipped with neck-clamping members, a locking device for said neck-clamping members actuated by said lever, and means for feeding seals to the path of said seal-applying plunger.

20. In a seal-applying machine, the combination of a horizontally disposed shaft, a vertical plunger disposed above the same and actuated thereby, an inclined seal-applying plunger, a lever actuated by said first-named plunger and serving to actuate said second-named plunger, inclined bottle-supporting means equipped with neck-clamping members, a locking device for said neck-clamping members actuated by said lever, a chute through which seals may be fed to the path of said seal-applying plunger, an escapement connected with the lower portion of said chute, and escapement actuating means actuated by the seal-applying plunger.

21. In a seal-applying machine, the combination of a frame equipped at its front side with an inclined bottle-supporting device provided with neck-clamping members, a horizontally disposed shaft having its front end projecting at the front side of said frame, a vertical plunger disposed above said shaft and actuated thereby, an inclined seal-applying plunger actuated by said first-named plunger, a clutch on said shaft, a dog serving to disconnect said clutch, a spring-actuated lever tending to withdraw said dog, a latch for said lever normally restraining it against actuation by its spring, a bottle-actuated trip-device for said latch, and means for feeding seals to the path of the seal-applying plunger.

22. In a stopper-applying machine, the combination of a frame equipped at its front side with a supporting member, inclined neck-clamping members surmounting the same and having forwardly and upwardly opening jaws, a horizontal shaft having its front end projecting at the front side of the frame beneath said supporting member and equipped with a lever restoring cam, a pulley mounted on the opposite end of said shaft, a clutch device including a sliding clutch member, a dog normally holding said clutch member, dog-retracting mechanism including a spring-actuated lever tending to withdraw said dog, said lever equipped with means for engaging said cam to rest the lever, a latch normally restraining said lever from movement against action of its spring, an inclined trip-plunger adapted to release said latch and equipped beneath said supporting member with a part adapted to be engaged by the bottle when it is placed in the neck-clamping members, an inclined seal-applying plunger actuated from said shaft, and means for feeding seals to the path of said seal-applying plunger.

23. In a machine of the character set forth, the combination with a reciprocating stoppering-tool and bottle-supporting means, of a shaft through the medium of which the stoppering-tool is actuated, a pulley on said shaft equipped with a clutch member, a co-acting clutch member connected with the shaft, a dog normally holding said second named clutch member retracted, a dog-retracting member equipped with a cam, a cam-stud carried by said shaft adapted to disengage the dog-retracting member from the dog, a spring-actuated lever tending to withdraw said dog, a latch for said lever, a cam on said shaft serving to reset said lever, and a trip for said latch associated with the bottle supporting means, for the purpose set forth.

24. In a machine of the character set forth, the combination of a frame, a horizontal shaft having its front end equipped with a lever-restoring cam, a clutch device including a clutch member connected with the shaft, a dog normally holding said clutch member disengaged, dog-retracting mechanism including a spring-actuated lever adapted to be restored by said cam, a latch for said lever, a vertical plunger actuated by said shaft, an inclined seal-applying plunger actuated by said vertical plunger, and bottle-supporting means, including an inclined trip-plunger adapted to release said latch.

25. In a machine of the character set forth, the combination of a horizontally disposed shaft, clutch mechanism controlling the operation of said shaft, an inclined seal-applying plunger actuated by said vertical plunger, and a bottle-neck clamping device comprising a supporting member and a pair of neck-clamping members surmounting the same and mounted thereon, said neck-clamping members disposed in an inclined position and opening forwardly and upwardly to permit insertion of the bottle by lateral movement.

HARRY M. BROWN.

In presence of—
CLAYTON F. McKENLY,
JOHN H. LEE.